United States Patent [19]
Zellering

[11] Patent Number: 5,698,781
[45] Date of Patent: Dec. 16, 1997

[54] FIRE SERVICE METER

[75] Inventor: Amram Zellering, Haifa, Israel

[73] Assignee: Arad Dalia Ltd., Israel

[21] Appl. No.: 666,070

[22] Filed: Jun. 14, 1996

[30] Foreign Application Priority Data

Jun. 15, 1995 [IL] Israel .................................. 114155

[51] Int. Cl.[6] .................................................... G01F 7/00
[52] U.S. Cl. ................................................ 73/197; 137/527
[58] Field of Search ........................ 73/276, 197; 137/527, 137/527.4; 251/298, 337

[56] References Cited

U.S. PATENT DOCUMENTS

| | | | |
|---|---|---|---|
| 888,368 | 5/1908 | Trude | 137/527 |
| 2,739,742 | 3/1956 | Anderson | 251/298 |
| 2,827,259 | 3/1958 | Kindt | 251/298 |
| 2,827,921 | 3/1958 | Sherman et al. | 137/527 |
| 5,046,525 | 9/1991 | Powell | 137/527 |
| 5,072,753 | 12/1991 | Ackroyd | 137/527 |
| 5,146,949 | 9/1992 | Retzloff et al. | 137/527 |
| 5,257,537 | 11/1993 | Bianchi | 73/197 |
| 5,411,056 | 5/1995 | Solaroli | 137/527.4 |

FOREIGN PATENT DOCUMENTS 485612  12/1917  France .................................. 137/527

OTHER PUBLICATIONS

Neptune Fire Service Meter Literature, Aug., 1986, 7 pages.
SENSUS™ Fire Service Meter Literature, date unknown, 12 pages.
Hersey® Products, Inc. Fire Service Meter Literature, Aug., 1989, 4 pages.

*Primary Examiner*—Richard Chilcot
*Assistant Examiner*—Jewel V. Artis
*Attorney, Agent, or Firm*—Webb Ziesenheim Bruening Logsdon Orkin & Hanson, P.C.

[57] ABSTRACT

A fire service meter that includes a strainer, a high flow water meter, a low flow water meter and a check valve fluidly coupled together. The check valve includes a sealing member or clapper adapted to seal against a valve seat. A shaft is secured to the clapper via a pivot arm. The shaft has a portion that extends externally of a body of the check valve. A bracket is secured to the external portion of the shaft. Two springs are provided each having one end attached to the bracket and their opposite ends attached to the body. The springs are arranged so that in a first position both springs apply a closing moment to the bracket so as to force the clapper in a closed position. As a pressure differential increases across the clapper and forces the clapper to move away from the valve seat, the position of the springs change so that one of the springs applies an opening moment to the bracket so as to decrease the amount of head loss associated with the opening of the clapper.

20 Claims, 8 Drawing Sheets

FIRE SERVICE METER

BACKGROUND OF THE INVENTION

1. Field of the Invention

This invention relates to water meters, and more particularly, to fire service water meters.

2. Description of the Prior Art

All communities must have a source of potable water to survive and grow. Prior to the 1900s, at least in the United States of America, potable water was mostly supplied by well water. Even today, well water is the only potable water supply available to people living in rural areas. However, as the urban areas grew during the late 1800s, an alternative source of potable water was necessary.

In response to the growing demand for potable water, water utilities were formed. The water utilities, whether governmentally owned or privately owned, laid pipelines to supply water to each and every household and developed reservoirs and water purification sites to convert non-potable water (such as river water) into potable water. Storage facilities, such as reservoirs, were built to store the potable water. This stored water was then distributed through the pipelines.

Water utilities are financially supported by taxes and/or user fees. If the tax is in the form of a flat tax, then those end users which use very little water subsidize the users of large volumes of water. Alternatively, the end users can pay a fee directly related to the actual amount of water used. Water meters were developed in response to these needs. Water meters also permit the water utilities to account for all the water flowing through its system to determine whether they are losing substantial quantities of water either through evaporation, leaks, or theft.

Water meters come in many shapes and sizes depending on the quantity and frequency of water use. Examples of such meters are turbine-type meters, multi-jet meters and positive displacement meters. Some of these water meters are more accurate for high flow rates while others are more accurate for low flow rates. Another aspect that must be taken into consideration when installing a particular type of water meter is the head loss or the pressure drop across the meter. Preferably, the utilities want meters with a low head loss because a meter with a high head loss negatively affects the flow rate across the meter.

In fire service meters or fire service water meters, the volume of water can vary greatly from several gallons a minute to thousands of gallons per minute. In this case, a compound meter is necessary. Compound meters utilize two meters that measure the volume of water passing through the meter, one at low flow rates and another at high flow rates. A strainer is provided upstream and a check valve is provided downstream. In operation, water flowing at a low flow rate passes through the strainer and the low flow water meter and exits an exit port. However, if a large flow rate of water is required, such as through the activation of a sprinkler system, then the check valve is activated and water passes through both meters. The type of check valve utilized greatly affects the head loss and accuracy of the fire service meter.

Today, most, if not all of the check valves used in fire service meters are of a similar design and include a valve body and a cam and/or weight loaded operating mechanism for preventing flow through the check valve during low flow. The operating mechanism which is contained within the valve body and submerged in water includes a sealing member adapted to engage against a sealing surface. Under the American Water Works Association (AWWA) Standards, the fire service meters are required to be tested at least yearly to determine whether they are operational. Heretofore, under the AWWA Standards, the utilities were required to disassemble these check valves and visually inspect the operating mechanism as part of the test procedure, which is a time consuming process. First, the water supply valve to the fire service meter must be shutoff and the check valve cover removed so that the operating mechanism can be visually inspected. Assuming all is in order, the cover then must be replaced and the water supply valve must be reopened.

Therefore, it is an object of the present invention to provide a fire service meter having a check valve that lowers head loss during operation.

It is another object of the present invention to provide a fire service meter having a check valve that can be easily inspected.

SUMMARY OF THE INVENTION

The present invention is a fire service meter including a strainer having an inlet and an outlet, a high flow water meter, a low flow water meter and a check valve. The high flow water meter is fluidly coupled to the strainer outlet and the low flow water meter is fluidly coupled to the strainer outlet in parallel to the high flow water meter. An exit port is fluidly coupled to the low flow water meter and the high flow water meter downstream from the strainer. The check valve is fluidly coupled to the high flow water meter and positioned between the strainer and the exit port. The check valve includes a body defining a flow-through chamber having an inlet end and an outlet end. The body also defines a sealing surface positioned within the chamber. A sealing member is adapted to engage the sealing surface. A shaft is secured to the sealing member. A portion of the shaft extends externally of the body and is pivotally secured to the body so that the shaft can rotate about a longitudinal axis. A bracket is secured to the portion of the shaft that extends externally of the body. The bracket is adapted to rotate about the longitudinal axis external of the body. Two springs are provided. The first spring has one end attached to the bracket and the second end is attached to the body. Likewise, the second spring has two ends, where one of the spring ends is attached to the bracket and the other of the spring ends is attached to the body. The first spring and the second spring are also positioned external of the body. When the sealing member abuts the sealing surface, both the first spring and the second spring provide a moment against the bracket so as to maintain the sealing member in a closed position. When the bracket is rotated an angle "ω", the first spring provides an opposite moment on the bracket from the second spring.

Another aspect of the present invention is a check valve that includes a body defining a flow-through chamber having an inlet end and an outlet end. The body defines a sealing surface positioned within the chamber. A sealing member is adapted to engage the sealing surface. A shaft is secured to the sealing member and pivotally secured to the body so that the shaft can rotate about a longitudinal axis. A bracket is secured to the shaft. The bracket is coupled to the sealing member through the shaft, wherein moments are applied to the bracket about the longitudinal axis that may cause or assist the sealing member to rotate about the longitudinal axis. Two springs are provided. The first spring having one end attached to the bracket and a second end attached to the body. Likewise, the second spring has two ends, wherein one of the ends is attached to the bracket and the other end is attached to the body. When the sealing member abuts against the sealing surface, the first spring and second spring provide a moment against the bracket so as to maintain the sealing member in a closed position. When the bracket is rotated an angle "ω", the first spring provides an opposite moment on the bracket from the second spring.

Another aspect of the present invention is a check valve similar to the previously described check valve, except the shaft has a portion that extends externally of the body and the bracket is secured to the shaft at the portion that extends externally of the body and one spring is provided having two ends, wherein the spring and the bracket are both positioned externally of the body and the spring applies a moment to the bracket to affect the position of the sealing member relative to the sealing member surface.

Another aspect of the present invention is a method for operating the above-described fire service meter, which includes the steps of: applying a closing moment to the sealing member by the first spring and the second spring so that the sealing member abuts against the sealing surface; passing water through the strainer at a first flow rate so that a water pressure differential across the sealing member results in an opening moment to the sealing member, the opening moment being less than the closing moment so as to maintain the sealing member in a sealed relationship, thereby causing all the water passing through the strainer to pass through the low flow water meter and bypass the high flow water meter; increasing the pressure differential across the sealing member so that the opening moment is greater than the closing moment so as to move the seal away from the sealing surface; and rotating the bracket an angle "ω" while the first spring applies to the sealing member a closing moment and the second spring applies an opening moment to the sealing member, aiding a speedy opening.

Another aspect of the present invention is a method for inspecting the above-described check valves, where the bracket is positioned externally of the check valve body and which is connected to a fluid line, without disrupting the flow of water, the method including the steps of: manually rotating the externally positioned bracket from a first position greater than the angle "ω" and when no water is passing through the check valve; releasing the bracket; and observing whether the bracket returns to the first position.

DESCRIPTION OF THE PREFERRED EMBODIMENT

Figure 1:
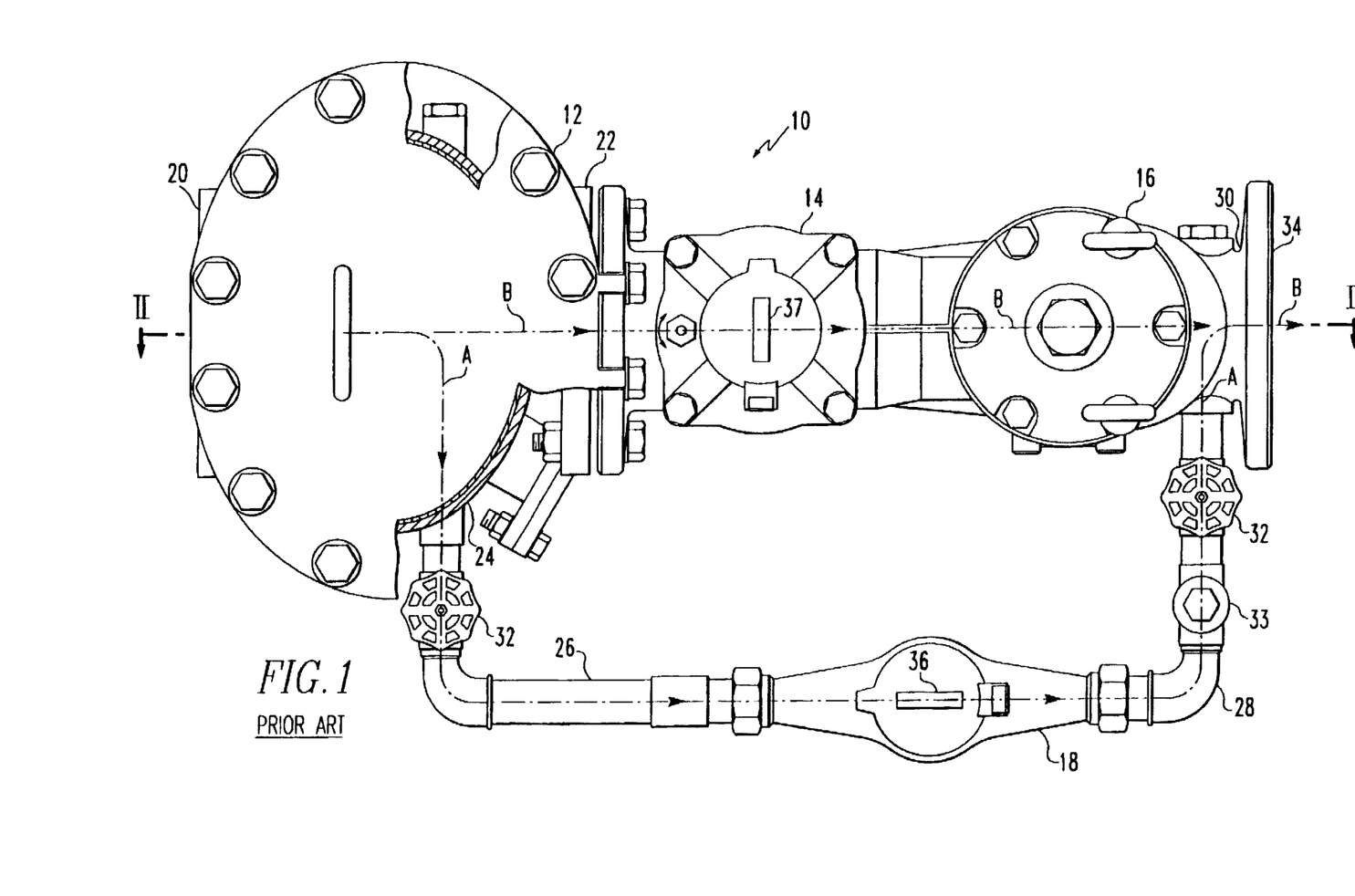
FIG. 1 is a top plan view, partially in section, of a prior art fire service meter.
Figure 2:
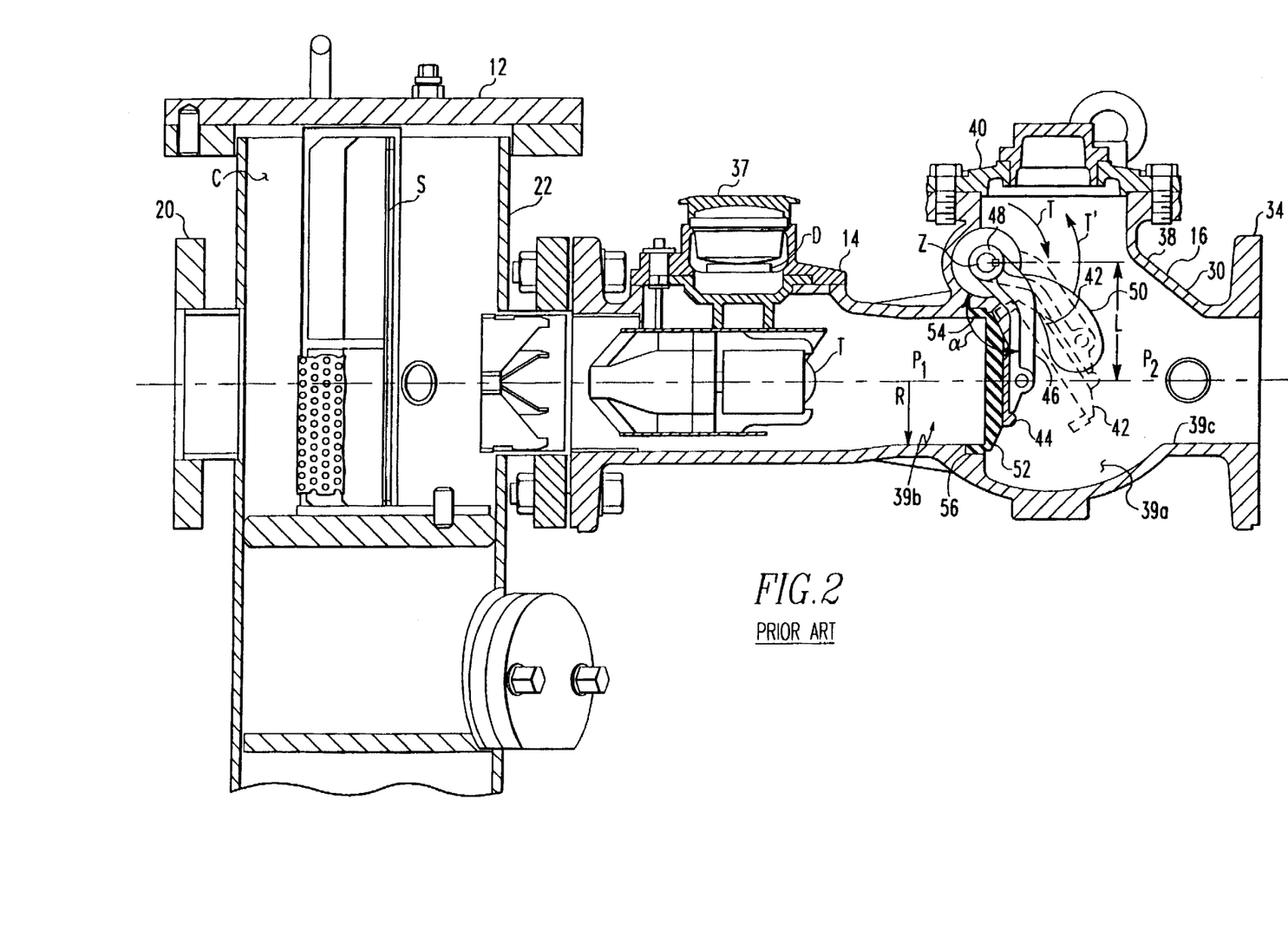
FIG. 2 is a section taken along lines II—II of FIG. 1.

FIGS. 1 and 2 show a prior art fire service meter 10. Fire service meter 10 includes a strainer 12, a high flow turbine water meter 14, a check valve 16 and a low flow multi-jet water meter or positive displacement meter 18. The strainer 12 includes an inlet 20 provided in a strainer body which defines a strainer cavity "C". A screen "S" is provided within the body through which water passes and is strained. Strainer inlet 20 defines an inlet of the fire service meter. Two outlets 22 and 24 are provided on a downstream side of the strainer 12. An upstream side of the high flow turbine water meter 14 is fluidly coupled to the outlet 22. The turbine meter includes a turbine "T" mechanically coupled to a drive arrangement "D" that cooperates with a register for measuring the quantity of water passing through the meter. The check valve 16 is fluidly coupled to a downstream side of the high flow turbine water meter 14.

An end of pipe 26 is connected to outlet 24 of the strainer 12 and a second end of the pipe 26 is connected to an inlet side of low flow multi-jet water meter 18 so that the low flow multi-jet meter 18 is fluidly coupled to the strainer 12. One end of a pipe 28 is connected to an outlet side of the low flow multi-jet water meter 18 and a second end of pipe 28 is connected to an exit portion 30 of check valve 16. Stop valves 32 and a small back flow preventing valve 33 are provided in pipes 26 and 28. Valve 33 prevents recirculation of water throughout the fire service meter 10. The outlet portion 30 defines an outlet or exit port 34 of the fire service meter 10, which is fluidly coupled to both the high flow turbine water meter 14 and the low flow multi-jet water meter 18. The check valve 16 is fluidly coupled to the high flow turbine water meter 14 and is positioned between the strainer 12 and the outlet 34. Flanges are provided on the inlet 20 and outlet 34 for connecting to an inlet waterline and outlet waterline, respectively. In this arrangement, the high flow turbine water meter 14 is positioned in parallel to the low flow multi-jet water meter 18.

The fire service meter 10 incorporates off-the-shelf or standard components, such as strainer 12, manufactured by Mueller Steam Specialities, Inc., high flow turbine water meter 14, which can be a turbine meter, manufactured by Master Meter, Inc., and low flow multi-jet water meter 18, such as a multi-jet meter or position displacement meter, manufactured by Master Meter, Inc. Therefore, components will not be discussed in detail.

In operation, a valve (not shown) is opened downstream of outlet 34 so that water flows through the fire service meter 10. If the water flow is at a low rate, say approximately 10 gallons per minute although this depends on the size of the meter, water flows along flow path "A" through inlet 20, pipe 26, low flow multi-jet water meter 18, pipe 26, outlet portion 30 and outlet 34. Water flowing through the high flow turbine water meter 14 is prevented by the check valve 16, which is in a normally closed position. The volume of water flowing through the fire service meter 10 is recorded by register 36. As the demand for water increases to a higher flow rate, for example, to a flow rate of two hundred gallons per minute, the check valve 16 is forced to an open position so that water also flows along path "B" through high flow turbine water meter 14 and check valve 16. The amount of water passing through the fire service meter 10 is then recorded by register 37 of high flow turbine water meter 14 and register 36.

Referring now to FIG. 2, check valve 16 includes a casing or body 38 having a lid 40 that is bolted to the body 38. The body 38 defines a flow through chamber 39a having an inlet end 39b and an outlet end 39c. The body 38 can either be fastened to the body of the turbine meter or integrally formed therewith. A sealing arrangement 42 is provided. Sealing arrangement 42 includes a circular sealing member 44, a pivot arm 46, a cylindrical shaft 48 and a weight 50. The sealing member 44 includes a back member or clapper 52 having a rubber sealing ring 54. Rubber sealing ring 54 is adapted to abut against a sealing surface or valve seat 56 defined in body 38. The pivot arm 46 has one end secured to the sealing member 44 and another end secured to the shaft 48 so that the shaft 48 is secured to the sealing member 44 through the pivot arm 46. The pivot arm 46 includes two sections, where one section extends at an angle "α" from the other section. Ends (not shown) of the shaft 48 are received by bearings (not shown) which are secured to the body 38 so that the shaft can rotate about a longitudinal "Z" axis. The weight 50 is attached to the sealing member 44. In the normally closed position, as shown in FIG. 2, the weight applies a torque "T" or moment to the shaft 48 so as to force or bias the sealing ring 54 against the sealing surface 56 to prevent water from passing through the check valve 16 from the high flow turbine water meter 14.

In normal low flow situations, there will be a pressure differential across the sealing member 44. This pressure differential across the sealing member 44 equals $(P_1-P_2)$. $P_1$ is the upstream water pressure adjacent the upstream side of sealing member 44 and $P_2$ is the downstream water pressure adjacent the downstream side of the sealing member 44. The pressure differential causes an opening torque or moment "T'" to be applied to the shaft 48. Torque "T'" equals $L \times \pi R^2 \times (P_1-P_2)$, where "L" is a vertical distance between a center of sealing member 44 and the "Z" axis and "R" is the radius of the sealing member. As the pressure $P_1$ increases and $P_2$ drops due to an increase in the flow of water through low flow multi-jet water meter 18, "T'" will become greater than "T" causing the sealing arrangement to pivot so that the sealing member 44 moves away from the sealing surface 56 (as shown in phantom in FIG. 2). Water can now flow at higher rates through high flow turbine water meter 14 and check valve 16. As the flow of water decreases or stops, the differential pressure $(P_1-P_2)$ decreases so that the torque "T" causes the sealing arrangement 42 to close, thereby abutting the sealing ring 54 against the sealing surface 56.

In this arrangement, the water supply must be shutoff annually so that the lid 40 can be removed and the sealing arrangement 42 tested. Testing typically requires an individual to grab the pivot arm 46 and move the sealing member 44 away from the sealing surface 56 and then release the pivot arm 44 to insure that the sealing arrangement 42 properly seals and freely moves. In other arrangements, cam surfaces and rollers are provided and positioned to make an over center mechanism in an attempt to quickly move the sealing member 46 away from the sealing surface 56. However, corrosion affects the free movement of the rollers which, in turn, affects the movement of the sealing member 44.

As should now be evident, the more pressure loss is required to move the sealing arrangement 42 through its full range of movement, the greater the head loss across the fire service meter 10. This can drastically affect flow rate through the fire service meter 10 as well as the accuracy of the meter during the change over flows. By change over flow, it is meant during the period in which the sealing member 44 is in a closed position to when the sealing member 44 is in a fully opened position. The head loss can also be affected by corrosion of the previously described cam surface and rollers, which are submerged in water.

Figure 3:
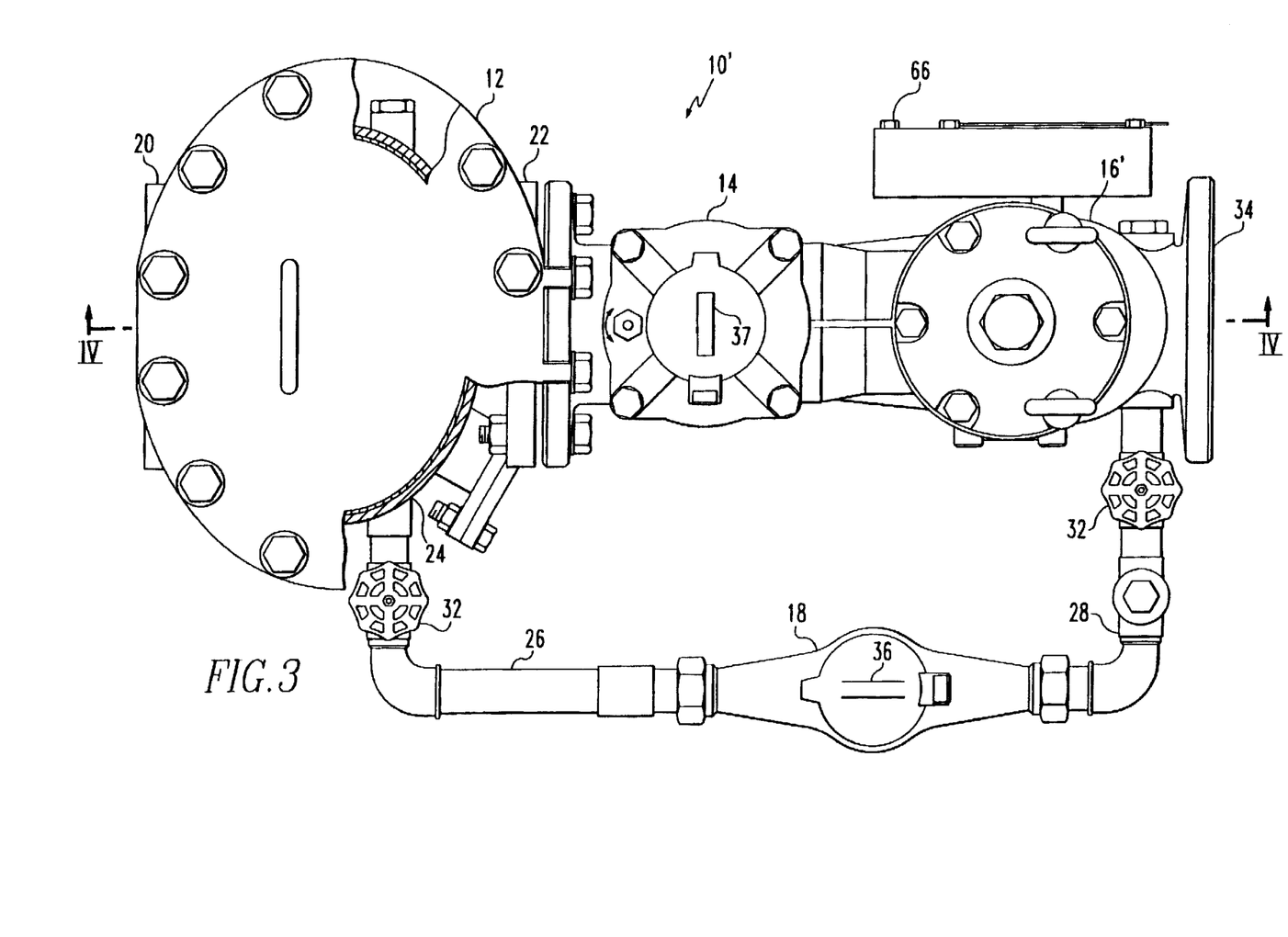
FIG. 3 is a top plan view, partially in section, of a fire service meter made in accordance with the present invention.
Figure 4:
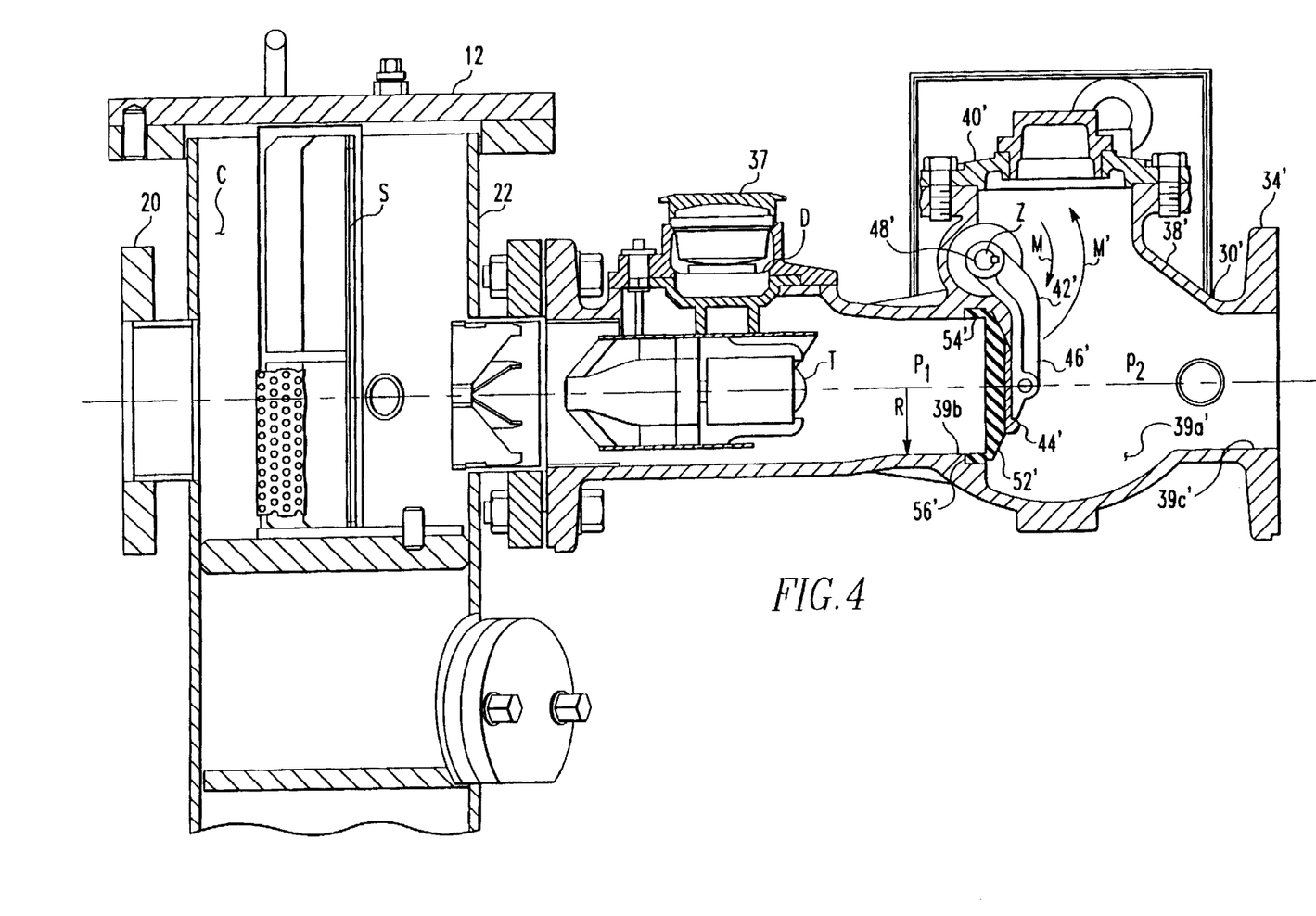
FIG. 4 is a section taken along lines IV—IV of FIG. 3.

FIGS. 3–4 show a fire service meter 10' made in accordance with the present invention. Fire service meter 10' is similar to fire service meter 10 with the exception of check valve 16. Therefore, like reference numerals will be used for like parts and only the differences will be discussed.

Check valve 16' is similar to check valve 16 and includes an outlet 34', a body 38', a lid 40', a sealing arrangement 42', a sealing member 44', a pivot arm 46', a shaft 48', a back member or clapper 52', a sealing ring 54' and a sealing surface or valve seat 56'. With the exception of the body 38' and the shaft 48', the aboveprimed elements are the same as previously discussed nonprimed counterparts.

Figure 5:
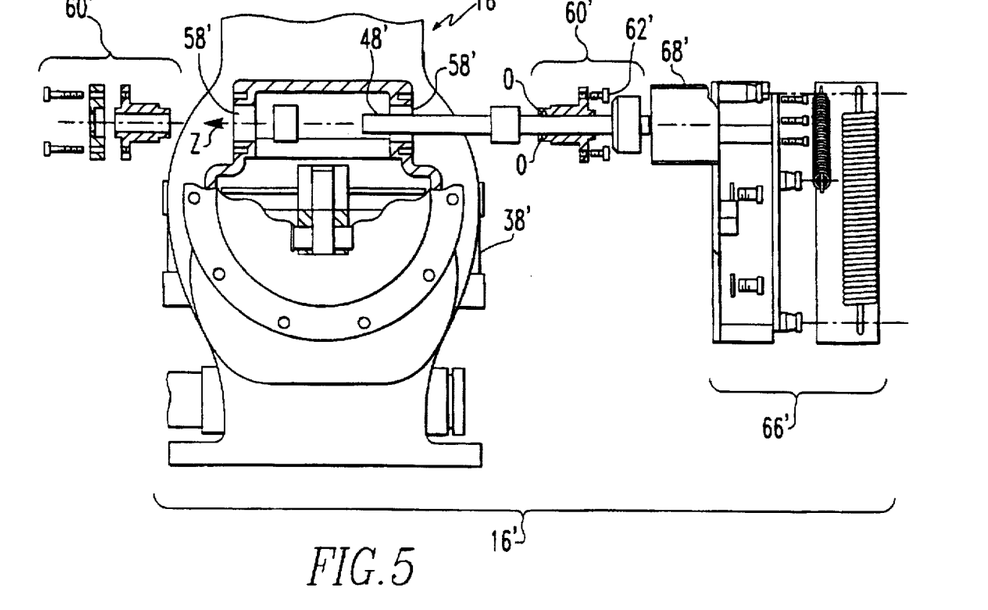
FIG. 5 is a front exploded view, partially in section, of a check valve made in accordance with the present invention.

Referring now to FIGS. 4 and 5, two bearing receiving holes 58' are defined in the body 38'. Bearing arrangements 60' are received within holes 58' and are secured to the body 38'. Portions of shaft 48' are received by the bearing arrangements 60 so that the shaft 48' can rotate about the "Z" axis. A liquid seal 0, such as an O-ring, is positioned between the shaft 48' and the body 38' and provided so that water does not leak out between the shaft 48', the bearing arrangement 60' and the body 38'. A portion 62' of the shaft 48' extends externally of the body 38'. A connecting disk 64' is secured near an end of the shaft external portion 62'. The connecting disk 64' is received within an external control box 66'.

Figure 6:
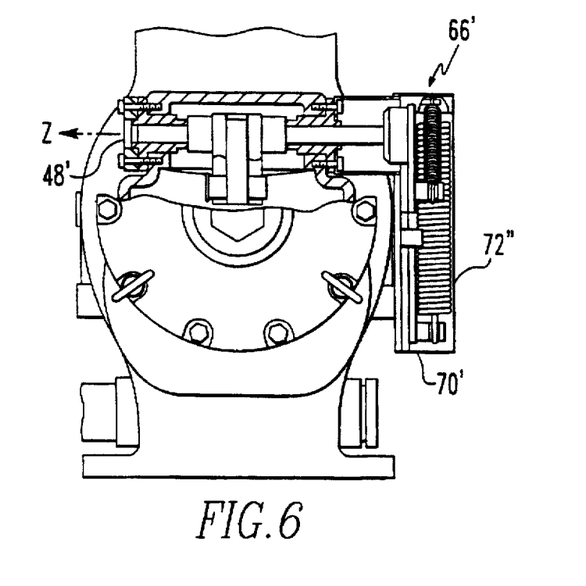
FIG. 6 is a front elevational view, partially in section, of the check valve shown in FIG. 5 and a nonexploded view.
Figure 7:
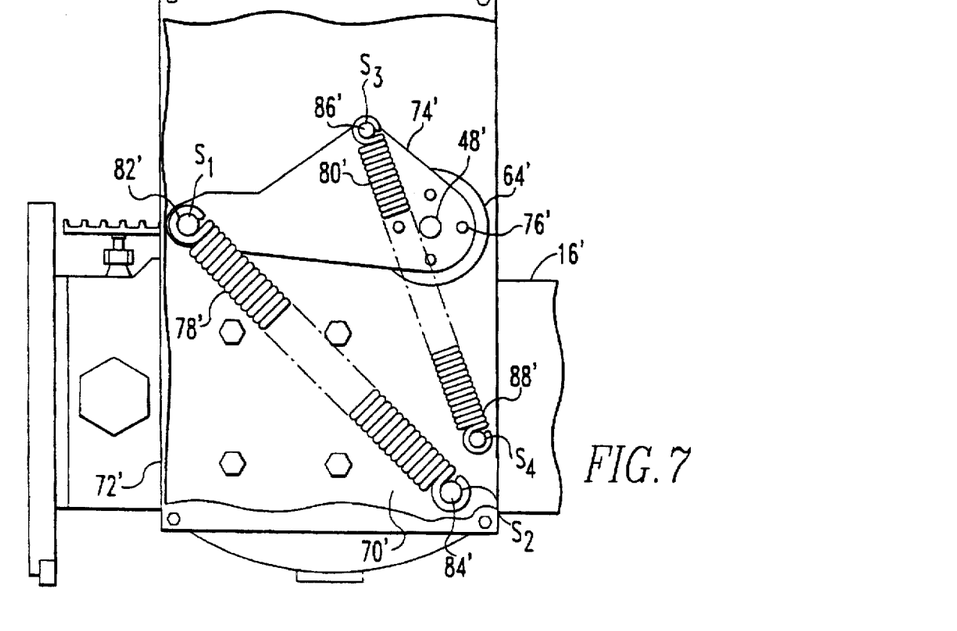
FIG. 7 is a side elevational view, partially in section, of the check valve shown in FIGS. 4 and 5.

Control box 66' is fixedly attached to body 38' by fasteners so that connecting disk 64' is received within a bushing 68' as shown in FIGS. 6 and 7. Control box 66' includes a base 70' and a removable lid 72' attached to the base by threaded fasteners. The bushing 68' is secured to an underside of base 70'. A bracket 74' is attached to the connecting disk 64' by four screws 76' through which bracket 74' is attached to the shaft 48'. In this arrangement, moments applied to the bracket 74' about the longitudinal "Z" axis may cause or assist the sealing member 44' to rotate about the "Z" axis. This depends on the direction and the magnitude of the moments and whether the sealing member is abutting sealing surface 56'. Two tension springs 78' and 80' are provided and positioned external of the body 38'. The bracket 74' is contained within the control box 66' and the shaft 48' extends into the control box 66' through the base 70'.

Spring 78' has two looped ends 82' and 84'. End 82' is pivotally secured to a screw or fastener S1 fastened to bracket 74' and end 84' is pivotally secured to a screw or fastener S2 fastened to base 70'. Spring 80' has two looped ends 86' and 88'. End 86' is pivotally secured to a screw or fastener S3 fastened to bracket 74' and end 88' is pivotally secured to a screw or fastener S4 fastened to base 70'. In this arrangement, ends 84' and 88' of springs 78' and 80' are attached to the body 38' through the control box 66' and screws S2 and S4. Screws S1, S2, S3 and S4 can also be pins. In this arrangement, the bracket 74' can pivot about the "Z" axis relative to the control box 66'. The springs 78' and 80' are in a stretched or tensioned state when secured to respective screws S1, S2, S3 and S4 so as to apply a closing moment "M" to the shaft 48' which, in turn, forces the sealing ring 54 to abut against the sealing surface 56 when it is in a closed position. The moment "M" approximately equals the tension force of the springs 78' and 80' multiplied by the distance bracket 74' when the check valve is in a closed position, such as shown in FIG. 4. When the check valve 16' is in the closed position, the sealing member 44' abuts against the sealing surface 56' and both springs 78' and 80' provide a moment against the bracket 74' maintaining the sealing member 44' in a closed position.

Figure 8:
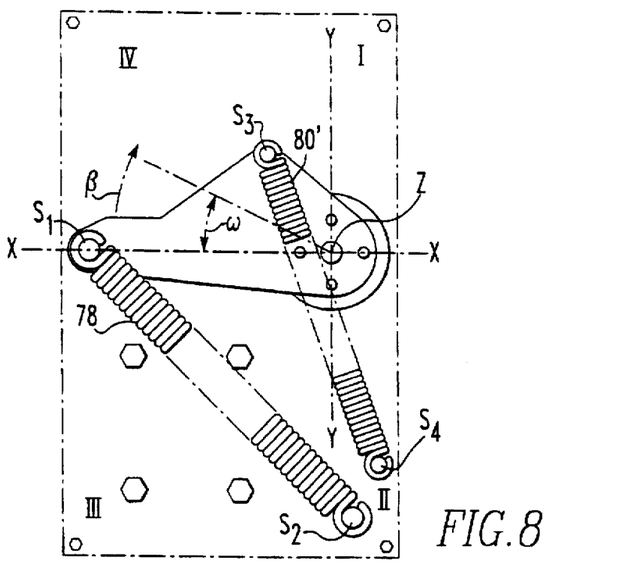
FIG. 8 is a side elevational view, partially in section, of a control box of the check valve shown in FIGS. 4-7.
Figure 9:
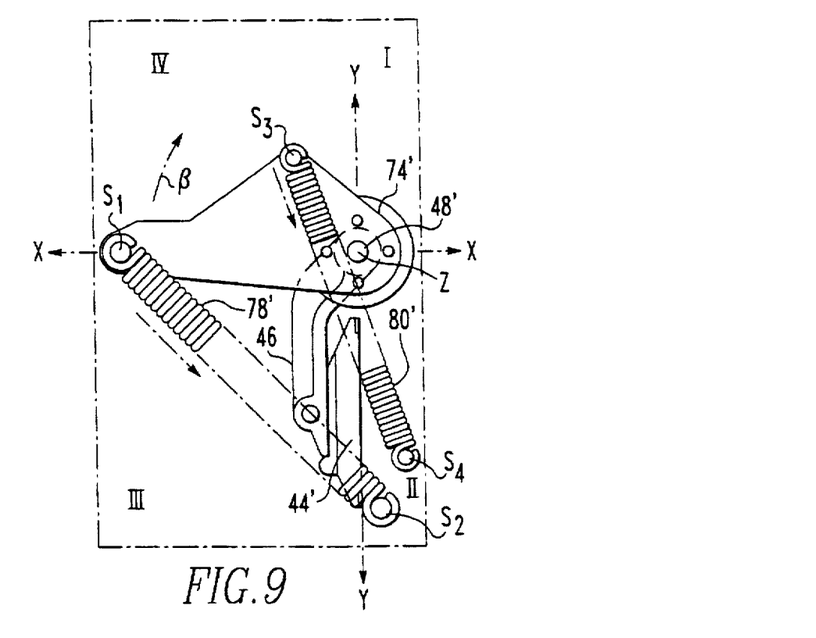
FIG. 9 is a side plan view of a portion of the control box as shown in FIG. 8 with a bracket in a first position.
Figure 10:
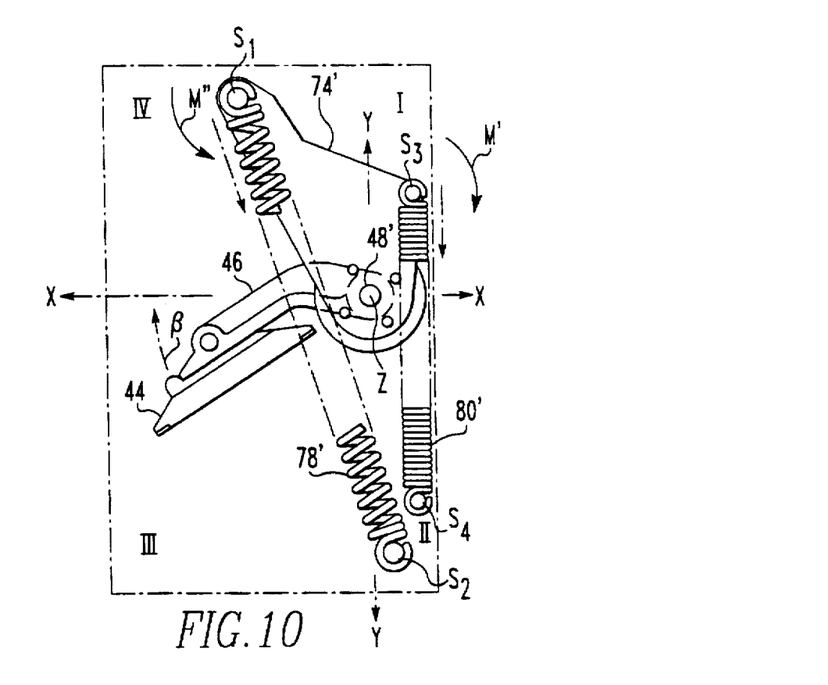
FIG. 10 is a side elevational view of the portion of the control box shown in FIG. 9 with the bracket in a second position.

Referring to FIGS. 8–10, a fixed "X-Y-Z" coordinate system is defined having its center positioned along the "Z" axis. The "X" and "Y" axes extend from the "Z" axis and are normal to the "Z" axis. The "X" axis passes through a center of screw S1 when the check valve is in the closed position. The "X-Y" axes, which are perpendicular to each other, define four quadrants I, II, III and IV. In this arrangement, as the bracket 74' begins rotating in the β direction, both screws S1 and S3 and ends 82' and 86' of springs 78' and 80' are in the same quadrant (II) and both springs 78' and 80' apply a closing moment "M" to the shaft 48'. The sealing member 44' remains in the closed position as water passes through the strainer 12 at a first flow rate, where the water pressure differential across the sealing member 44' results in an opening moment to the sealing member. This opening moment is less than the closing moment so that the sealing member 44' is maintained in a sealed relationship with the sealing surface so that all of the water passing through the strainer 12 passes through the low flow multi-jet water meter 18 and bypasses the high flow turbine water meter 14. However, the bracket rotates in the "β" direction when the pressure differential across the sealing member 44' is such that the opening moment is greater than the closing moment. As the sealing member 44' moves away from the sealing surface 56', the spring 80' applies less of a closing moment to the shaft. However, once the screw S3 passes into the next quadrant (III) (when the bracket is rotated an angle "ω" and the sealing member 44' is in a partial open position), the tension spring 80' applies an opening moment "M'" to assist in opening the sealing arrangement 42' (while the tension spring 78' still applies a closing moment "M''"), thereby reducing head loss across the check valve 16'. "M'" is an opposite moment from the moment "M''" applied by spring 78' and "M''" will always be greater than "M'" so that when the flow passing through the strainer and the check valve 16' stops or is decreased to a low flow rate, the check valve 16' is forced into the closed position. Decreasing water through the strainer 12 after water is passing through both the high flow turbine water meter 14 and the low flow multi-jet water meter 18 to a low flow rate causes a differential pressure across the sealing member 44' to result in an opening moment which is less than the closing moment. This causes the sealing member 44' moment to move to a sealing relationship with the sealing surface 56'.

Since the springs 78' and 80', bracket 74 and control box 66' are all external of the body 38', the valve can easily be inspected without disrupting the flow of water. Specifically, the lid 72 of the control box is removed from the base 70 which exposes the bracket 74' and the springs 78' and 80'. While the valve 16' is in a closed position and no water is passing through the check valve 16', an inspector can grab the bracket 74' with his or her hands and rotate the bracket in the "β" direction greater than the angle "ω" without turning off the supply of water. The inspector releases the bracket 74' and observes if the bracket 74' freely or smoothly returns (as opposed to an intermittent action or jerking) to its original position, that is the closed position, then the valve is in working order. A torque wrench can also be used to test and determine the torque required to rotate the bracket 74' a fixed angular distance. If, however, the bracket does not return to the original position, then the valve must be disassembled and repaired. The inspection procedure is substantially easier than that of the previous described prior art. Also, since the springs 78' and 80' are positioned external of the body and are not immersed in water, they will not fail as frequently as the prior art cam and roller arrangement due to corrosion.

As now should be evident, the present invention reduces head loss in fire service meters from that of the prior art and enables easier inspection of these meters than that of the prior art.

Figure 11:
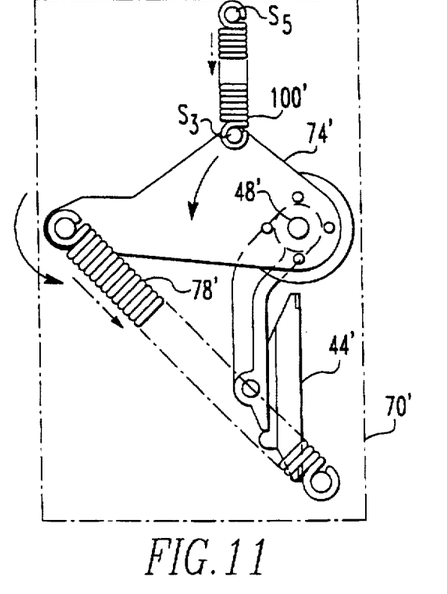
FIG. 11 is a second embodiment of a portion of the control box with the bracket in a first position.
Figure 12:
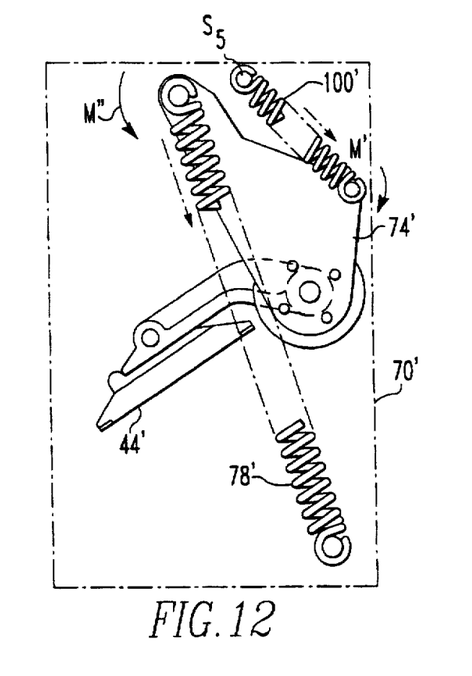
FIG. 12 is a side elevational view of the portion of the control box shown in FIG. 11 with the bracket in a second position.

FIGS. 11 and 12 show an alternate arrangement for the springs 78' and 80', where spring 80' is replaced by a compression spring 100'. One looped end of the spring is secured to screw S3 and another looped end is secured to a screw S5. In the closed position, both springs 78' and 100' apply a closing moment to the sealing member 44'. In the open position, spring 78' still applies a closing moment to the sealing member 44' and spring 100' applies an opening moment to the sealing member 44' through bracket 74'. Alternatively, depending on the bracket design and spring design, both springs could also be compression springs or spring 78' could be replaced with a compression spring while tension spring 80' remains in place.

Having described the presently preferred embodiments of the invention, it is to be understood that it may otherwise be embodied within the scope of the appended claims.

I claim:
1. A fire service meter, comprising:
a strainer having an inlet and an outlet;
a high flow water meter fluidly coupled to said strainer outlet;
a low flow water meter fluidly coupled to said strainer outlet in parallel to said high flow water meter;
an exit port fluidly coupled to said low flow water meter and said high flow water meter downstream from said strainer; and
a check valve fluidly coupled to said high flow water meter and positioned between said strainer and said exit port, said check valve comprising:
a body defining a flow-through chamber, having an inlet end and an outlet end, said body defining a sealing surface positioned within said chamber;
a sealing member adapted to engage said sealing surface;
a shaft secured to said sealing member, said shaft having a portion that extends externally of said body, said shaft pivotally secured to said body so that said shaft can rotate about a longitudinal axis;
a bracket secured to said shaft, said bracket coupled to said sealing member through said shaft, wherein moments applied to said bracket about said longitudinal axis may assist said sealing member to rotate about the longitudinal axis; and
a first spring having two ends, wherein one end is attached to said bracket and a second end is attached to said body and a second spring having two ends, wherein one of said second spring ends is attached to said bracket and the other of said second spring ends is attached to said body, said first spring and said second spring positioned external of said body, wherein when said sealing member abuts against said sealing surface both said first spring and said second spring provide a moment against said bracket maintaining said sealing member in a closed position, and when said bracket is rotated an angle "ω", said first spring provides an opposite moment on said bracket from said second spring.

2. A fire service meter as claimed in claim 1, further comprising a pivot arm secured to said sealing member and said shaft.

3. A fire service meter as claimed in claim 1, wherein said springs are tension springs.

4. A fire service water meter as claimed in claim 1, further comprising a seal provided on said shaft and positioned between said shaft and said body.

5. A fire service meter as claimed in claim 4, wherein said seal is an O-ring.

6. A fire service meter as claimed in claim 1, wherein said bracket is contained within a box attached to said body and said shaft extends into said box.

7. A fire service meter as claimed in claim 6, wherein said box comprises a removable lid so as to expose said bracket, said first spring and said second spring.

8. A fire service meter as claimed in claim 1, wherein two perpendicular axes are defined that extend from the longitudinal axis and are normal thereto, the two perpendicular axes defining four quadrants, wherein when said sealing member is in a closed position, one end of each of said first spring and said second spring are positioned in the same quadrant and when said bracket is rotated an angle "ω" and said sealing member is in a partial open end position, said one end of said first spring is in a different quadrant than said one end of said second spring and said first spring provides an opposite moment on said bracket from said second spring.

9. A fire service meter as claimed in claim 4, wherein each of said springs has loops defined at their ends for receipt of fasteners.

10. A fire service meter as claimed in claim 1, wherein said first spring and said second spring are in tension when said sealing member is in a closed position.

11. A fire service meter as claimed in claim 1, wherein said check valve is positioned downstream of said high flow water meter.

12. A fire service water meter as claimed in claim 1, wherein said high flow water meter is a turbine meter.

13. A fire service meter as claimed in claim 1, wherein said low flow service meter is selected from one of a group of positive displacement meters and multi-jet meters.

14. A fire service meter as claimed in claim 1, wherein said springs are compression springs.

15. A check valve, comprising:

a body defining a flow-through chamber having an inlet end and an outlet end, said body defining a sealing surface positioned within said chamber;

a sealing member adapted to engage said sealing surface;

a shaft secured to said sealing member, said shaft pivotally secured to said body so that said shaft can rotate about a longitudinal axis;

a bracket secured to said shaft, said bracket coupled to said sealing member through said shaft, wherein moments applied to said bracket about said longitudinal axis may assist said sealing member to rotate about the longitudinal axis; and a first spring having two ends, wherein one end is attached to said bracket and a second end is attached to said body and a second spring having two ends, wherein one of said second spring ends is attached to said bracket and the other of said second spring ends is attached to said body, wherein when said sealing member abuts against said sealing surface, said first spring and said second spring provide a moment against said bracket maintaining said sealing member in a closed position, and when said bracket is rotated an angle "ω", said first spring provides an opposite moment on said bracket from said second spring.

16. A method for operating a fire service meter, said fire service meter, comprising:

a strainer having an inlet and an outlet;

a high flow water meter fluidly coupled to said strainer outlet;

a low flow meter fluidly coupled to said strainer outlet in parallel to said high flow water meter;

an exit port fluidly coupled to said low flow water meter and said high flow water meter downstream from said strainer; and a check valve fluidly coupled to said high flow water meter and positioned between said strainer and said exit port, said check valve, comprising:

a body defining a flow-through chamber, having an inlet end and an outlet end, said body defining a sealing surface positioned with said chamber, a sealing member adapted to engage said sealing surface, a shaft secured to said sealing member, said shaft pivotally secured to said body so that said shaft can rotate about a longitudinal axis, a bracket secured to said shaft, said bracket coupled to said sealing member through said shaft, wherein moments applied to said bracket about said longitudinal axis may assist said sealing member to rotate about the longitudinal axis, a first spring having two ends, wherein one end is attached to said bracket and a second end is attached to said body; and a second spring having two ends, wherein one of said second spring ends is attached to said bracket and the other of said second spring ends is attached to said body, said method comprising the steps of:

a) applying a closing moment to said sealing member by both said first spring and said second spring so that said sealing member abuts against said sealing surface;

b) passing water through said strainer at a first flow rate so that a water pressure differential across said sealing member results in an opening moment to said sealing member, said opening moment being less than said closing moment so as to maintain said sealing member in a sealed relationship with said sealing surface, thereby causing all of the water passing through said strainer to pass through said low flow water meter and bypass said high flow water meter;

c) increasing the pressure differential across said sealing member so that the opening moment is greater than the closing moment so as to move the sealing member away from the sealing surface; and d) rotating said bracket an angle "ω" so that said first spring applies a closing moment to said sealing member and said second spring applies an opening moment to said sealing member.

17. A method for operating a fire service meter as claimed in claim 16, further comprising the step of:

decreasing the flow of water through said strainer after water is passing through both said high flow water meter and said low flow water meter so that the pressure differential across said sealing member results in an opening moment which is less than the closing moment so that said sealing member moves to a sealing relationship with said sealing surface.

18. A method for inspecting a check valve connected to a fluid supply line without disrupting the flow of water, wherein said check valve, comprising:

a body defining a flow-through chamber, having an inlet end and an outlet end, said body defining a sealing surface positioned with said chamber;

a sealing member adapted to engage said sealing surface;

a shaft secured to said sealing member, said shaft having a portion that extends external of said body, said shaft pivotally secured to said body so that said shaft can rotate about a longitudinal axis;

a bracket secured to said shaft, said bracket coupled to said sealing member through said shaft, wherein moments applied to said bracket about said longitudinal axis may cause said sealing member to rotate about the longitudinal axis;

a first spring having two ends, wherein one end is attached to said bracket and a second end is attached to said body and a second spring having two ends, wherein one of said second spring ends is attached to said bracket and the other of said second spring ends is attached to said body, wherein when said sealing member abuts against said sealing surface, said first spring and said second spring both provide a moment to said bracket maintaining said sealing member in a closed position, and when said bracket is rotated an angle "ω", said first spring provides an opposite moment to said bracket from said second spring, said method comprising the steps of:
a) manually rotating said bracket from a first position greater than the angle "ω" and without turning off the water supply to said check valve and when no water is passing through said check valve;
b) releasing said bracket; and
c) observing whether said bracket returns to said first position.

19. A fire service meter, comprising:

a strainer having an inlet and an outlet;

a high flow water meter fluidly coupled to said strainer outlet;

a low flow meter fluidly coupled to said strainer outlet side in parallel to said strainer;

an exit port fluidly coupled to said low flow water meter and said high flow water meter downstream from said strainer;

a check valve fluidly coupled to said high flow water meter and positioned between said strainer and said exit port, said check valve comprising a body defining a flow-through chamber, having an inlet end and an outlet end, said body defining a sealing surface positioned with said chamber;

a sealing member adapted to engage said sealing surface;

a shaft secured to said pivot arm, said shaft pivotally secured to said body so that said shaft can rotate about a longitudinal axis;

a bracket secured to said shaft, said bracket coupled to said sealing member through said shaft, wherein moments applied to said bracket about said longitudinal axis may assist said sealing member to rotate about the longitudinal axis; and a first spring having two ends, wherein one end is attached to said bracket and a second end is attached to said body and a second spring having two ends, wherein one of said second spring ends is attached to said bracket and the other of said second spring ends is attached to said body, wherein when said sealing member abuts against said sealing surface both of said first spring and said second spring provide a moment against said bracket as to maintain said sealing member in a closed position, and when said bracket is rotated an angle "ω", said first spring provides an opposite moment on said bracket from said spring.

20. A check valve as claimed in claim 15, wherein said shaft having a portion that extends externally of said body and said bracket is secured to said shaft at said portion that extends externally of said body, whereby said bracket, said first spring and said second spring are positioned externally of said body.

* * * * *

UNITED STATES PATENT AND TRADEMARK OFFICE
CERTIFICATE OF CORRECTION

PATENT NO. : 5,698,781
DATED : December 16, 1997
INVENTOR(S) : Amram Zellering

It is certified that error appears in the above-identified patent and that said Letters Patent is hereby corrected as shown below:

Title Page, [57] ABSTRACT, line 15, "change" should read --changes--.

Column 2 Line 8 "shutoff" should read --shut off--.

Column 2 Line 64 "provided. The" should read --provided, the--.

Column 5 Line 51 "shutoff" should read --shut off--.

Column 6 Line 2, "change over", first occurrence, should read --changeover--.

Column 6 Line 2, "change over", second occurrence, should read --changeover--.

Column 6 Line 18 "aboveprimed" should read --above-primed--.

Column 6 Line 19 "nonprimed" should read --non-primed--.

Column 6 Line 25 "liquid seal 0" should read --liquid seal O--.

Column 7 Line 1 between "distance" and "bracket" insert --screws S1 and S3 are from the "Z" axis. Fig. 7 shows the --.

Claim 16 Column 10 Line 5 between "meter" and "comprising" delete comma --,--.

Claim 16 Column 10 Line 9 between "low flow" and "meter" insert --water--.

Claim 16 Column 10 Line 16 "said check valve, comprising" should read --said check valve comprising--.

UNITED STATES PATENT AND TRADEMARK OFFICE
CERTIFICATE OF CORRECTION

PATENT NO.  : 5,698,781
DATED       : December 16, 1997
INVENTOR(S) : Amram Zellering It is certified that error appears in the above-identified patent and that said Letters Patent is hereby corrected as shown below:

Claim 18 Column 10 Line 67 "wherein said check valve, comprising" should read --wherein said check valve comprises--.

Claim 18 Column 11 Line 3 "with said chamber" should read --within said chamber--.

Claim 19 Column 11 Line 39 "low flow meter" should read --low flow water meter--.

Claim 19 Column 12 Line 9 "with said chamber" should read --within said chamber--.

Claim 19 Column 12 Line 27 after "bracket" insert --so--.

Signed and Sealed this

Nineteenth Day of May, 1998

Attest:

BRUCE LEHMAN

*Attesting Officer*    *Commissioner of Patents and Trademarks*